May 26, 1925.
J. P. STEEPLE
1,539,001
EMERGENCY CONNECTION
Filed April 13, 1922
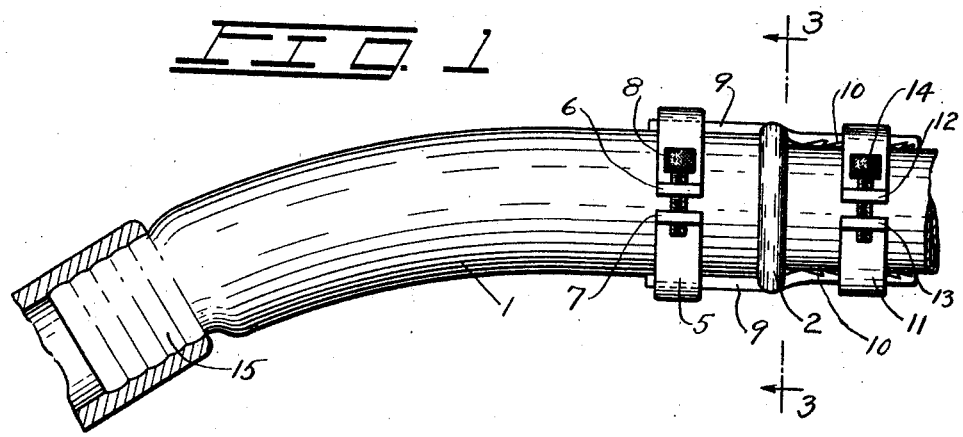
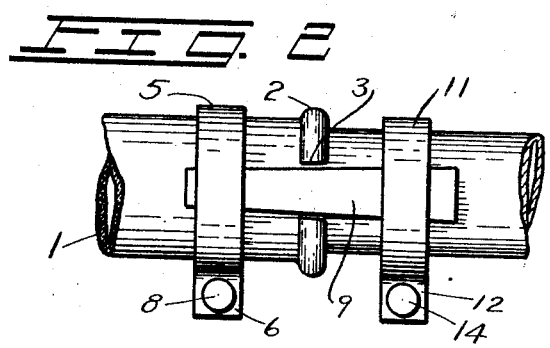
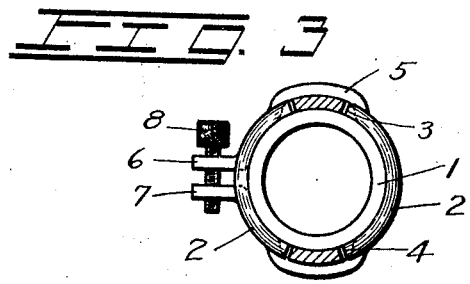
INVENTOR
John P. Steeple
BY
Harry Bowen
ATTORNEY Patented May 26, 1925.

1,539,001

UNITED STATES PATENT OFFICE.

JOHN P. STEEPLE, OF SEATTLE, WASHINGTON.

EMERGENCY CONNECTION.

Application filed April 13, 1922. Serial No. 552,141.

*To all whom it may concern:*

Be it known that I, JOHN P. STEEPLE, a subject of Great Britain, residing at Seattle, county of King, and State of Washington, have invented a new and useful Emergency Connection; and I do hereby declare that the following is a full, clear, and exact specification, such as will enable others skilled in the art to which it appertains to make and use the same.

The invention is a device which may readily be attached to the two ends of a broken air line which will make it possible to use the line.

The object of the invention is to provide a device which will connect the two ends of an air line which may easily be installed by one man.

Another object of the invention is to provide a short piece of flexible hose, one end of which may fit inside of an attachment and the other end of which is provided with gripping fingers which when pushed over the end of a pipe may be tightened to positively grip the pipe and form an air tight connection.

With these ends in view the invention embodies a piece of flexible hose having a beaded and tapered section at one end and a bead around the opposite end. A band is also placed around the opposite end which is provided with a set screw in its ends for tightening it on the device and this band has two bars projecting from it with teeth on their inner sides and another band around their outer ends also having a set screw in its ends for tightening it around the pipe.

Other features and advantages of the invention will appear from the following description taken in connection with the drawings, wherein:—

Figure 1 is a side elevation.
Figure 2 is a plan view.
Figure 3 is a cross section on line 3—3 of Figure 1.

In the drawings I have shown my device as it would be attached to the two ends of an air line wherein numeral 1 indicates a short piece of flexible tubing having a bead 2 around one end. The bead 2 has two slots in it as shown in Figure 2 which are indicated by the numerals 3 and 4. A band 5 is placed around the tube 1 and its two ends are bent outward to form flanges 6 and 7 which have threaded holes in their centers into which a set screw 8 is screwed. It will be seen that by turning the set screw the two flanges may be brought together which will cause the band to firmly grip the outer surface of the tube 1. Two bars 9 which are fixedly attached to the band 5 project out beyond the end of the tubing 1 and pass thru the slots 3 and 4 in the bead 2. On the inside of the outer ends of the bars 9 are teeth 10 as shown in Figure 1, and to these ends a band 11 whose ends are bent outward to form flanges 12 and 13 is fixedly attached. A set screw 14 is also placed in threaded holes in the centers of the flanges 12 and 13 by which the flanges may be drawn together which will cause the teeth 10 to positively grip the outside of the pipe over which the device is placed. At the opposite end of the tubing 1 is a beaded or ridged section which may be tapered to fit the inside of a coupling/so that this end of the device may be attached to the end of the air line by pushing it inside of it.

It will be understood that changes may be made in the construction without departing from the spirit of the invention. One of which changes may be in the bending of the bars 9 up over the bead 2 instead of slotting the bead to allow them to pass thru it. Another may be in the splitting of the bands on both sides and putting set screws in their ends so that they may be tightened up from each side instead of from only one side as shown. And still another change may be in the type of the teeth used on the inner sides of the bars.

The construction will be readily understood from the foregoing description. To use the device each end may be attached to the ends of an air line as shown in Figure 1. The end with the beads on it may be slipped into the inside of a fitting or the end of the pipe and the opposite end may be slipped over the end of a pipe and the screw 14 tightened so that the teeth 10 will grip the sides of the pipe to form a positive connection. It will be seen that with a device of this type it will be possible for one man to readily repair a broken air line by connecting the two ends together with this coupling.

Having thus fully described the invention, what I claim is new and desire to secure by Letters Patent is:—

A coupling comprising a piece of flexible tubing having a bead with slots through it around the exterior of one end, an adjustable clamp with arms extending from it through the slots in the bead and inside of the bead, and another clamp attached to the outer ends of the arms, said arms having teeth, the points of which slant toward the coupling, on the inner surfaces of their outer ends.

JOHN P. STEEPLE.